United States Patent [19]

Asano et al.

[11] Patent Number: 4,963,038
[45] Date of Patent: Oct. 16, 1990

[54] LINEAR GUIDE APPARATUS WITH PROTECTOR

[75] Inventors: Yoshio Asano, Maebashi; Masaru Hattori, Gumma, both of Japan

[73] Assignee: Nippon Seiko Kabushiki Kaisha, Tokyo, Japan

[21] Appl. No.: 408,239

[22] Filed: Sep. 18, 1989

[30] Foreign Application Priority Data

Sep. 29, 1988 [JP] Japan .............................. 63-127922[u]

[51] Int. Cl.⁵ .......................... F16C 33/72; F16C 29/06
[52] U.S. Cl. .......................................... 384/15; 384/45
[58] Field of Search ................................ 384/15, 43–45

[56] References Cited

U.S. PATENT DOCUMENTS 2,951,728 9/1960 Drake ..................................... 384/15
3,515,444 6/1970 Grabner ................................ 384/15

FOREIGN PATENT DOCUMENTS 63-121815 8/1988 Japan .
251622 10/1988 Japan ..................................... 384/15

Primary Examiner—Thomas R. Hannon
Attorney, Agent, or Firm—Basile and Hanlon

[57] ABSTRACT

A dust seal attached to each of the end caps of a slider main body is sandwiched at the front and rear surfaces by an outer protector and an inner protector. Each of the outer and inner protectors has a substantially similar shape to the shape of the dust seal. The outer protector is attached to the front surface of the dust seal interposing a spacer to form a gap therebetween to thereby prevent conduction of heat from the outer protector to the dust seal when weld sputters are adhered to the outer protector. The inner protector is closely in contact with the rear surface of the dust seal to form a backup member.

3 Claims, 4 Drawing Sheets

FIG. 9 *(PRIOR ART)*

LINEAR GUIDE APPARATUS WITH PROTECTOR

BACKGROUND OF THE INVENTION

1. Field of the Invention:

The present invention relates to a linear guide apparatus having a protector for protecting a dust seal.

2. Description of the Prior Art:

Generally, a linear guide apparatus, as shown in FIG. 9, includes a guide rail 1 extending in an axial direction and a slider 2 slidably straddling the guide rail 1. A ball rolling groove 3 having a semi-circular cross section and extending axially is formed in each of both side surfaces of the guide rail 1. The slider 2 has ball rolling grooves (not shown) formed in inner surfaces of both side walls 4 so that the ball rolling grooves of the slider 2 respectively oppose the ball rolling grooves 3 of the guide rail 1.

Many balls are rollably mounted between the corresponding ball rolling grooves of the guide rail 1 and the slider 2, and the slider 2 is moved axially on the guide rail 1 through the rolling of the balls. With the movement of the slider 2, the balls interposed between the guide rail 1 and the slider 2 are moved to an end of a slider main body 2A of the slider 2. In order to continuously move the slider 2, it is necessary to circulate the balls.

Thus, a ball return path (not shown) is formed in each of the side walls 4 of the slider main body 2A penetrating in the axial direction and, further, end caps 5 are attached to opposite ends of the slider main body 2A so that a ball circulating path is formed by bringing the ball return path in communication with a U-shaped connecting path formed in each of the end caps 5. Furthermore, since smooth rolling of the balls is disturbed when foreign matters, such as dust, cuttings, and the like, are deposited on the upper surface of the guide rail 1 or on the ball rolling grooves 3 in both sides of the guide rail 1, a dust seal 10 is usually attached as a wiper to each of the end caps 5.

Furthermore, reference numeral 12 in FIG. 9 designates a grease fitting threaded into the end cap 5.

The dust seal 10 is comprised of a metallic plate and a rubber member bonded to a front surface of the metallic plate. The rubber member has lip portions whose tip end forms an acute angle with the metallic plate. Cuttings of a large size or foreign matter such as weld sputters which are easily deposited on the guide rail 1 tend to intrude into the interior of the slider 2 by deforming or breaking the lip portions of the dust seal 10. In particular, a recess 3a for a wire retainer is formed in the bottoms of the ball rolling grooves 3 of the guide rail 1, and it is difficult to interrupt the intrusion of the foreign matter through the recess 3a by the weak projections of the lip portions.

Accordingly, as a countermeasure, a scraper having a minute clearance between the outer surface of the guide rail 1 is mounted on a forward surface of a rubber wiper. A linear guide apparatus having such a scraper is disclosed in Japanese Utility Model Laid-Open Publication No. 63-121815.

However, the scraper in the prior art linear guide apparatus mentioned above involves a problem in that since the scraper is attached to the forward (in a direction of movement) end surface of the rubber wiper closely in contact therewith, although cuttings of a large size are removed by the scraper, when hot weld sputters are deposited, the heat of the weld sputters is easily conducted to the rubber wiper causing the rubber wiper to be burned.

Moreover, since there is no backing member attached to the rear surface of the rubber wiper to support the weak and small lip portions, foreign matter which have passed through the clearance between the scraper and the guide rail will intrude into the interior of the slider by pushing the lip portions of the rubber wiper upwardly. Therefore, there is a problem in that in an adverse environment wherein a large amount of cuttings are generated, it is difficult to keep a useful service life of the linear guide apparatus, or to extend a maintenance interval or to achieve a maintenance-free service life.

SUMMARY OF THE INVENTION

The present invention was made in view of above-mentioned problems in the prior art, and it is an object of the invention to provide a linear guide apparatus with a protector which is capable of interrupting the intrusion of foreign matter even in an adverse environment, preventing the heat deterioration of the dust seal, keeping the useful service life of the linear guide apparatus, and realizing the extension of the maintenance interval or the maintenance-free service life.

In order to achieve this object, in the present invention, in a linear guide apparatus comprising a guide rail extending axially and having ball rolling grooves respectively formed in outer side surfaces in an axial direction, a slider main body movably straddling the guide rail and having ball rolling grooves formed in inner surfaces of both side walls, the ball rolling grooves of the slider main body respectively corresponding to the ball rolling grooves of the guide rail, the slider main body further formed with ball return paths respectively penetrating both the side walls axially and in parallel with the ball rolling grooves, end caps respectively joined to opposite ends of the slider main body, each of the end caps having a pair of ball return paths for communicating corresponding ones of the ball return paths and the ball rolling grooves with each other, dust seals respectively attached to axial end surfaces of the end caps, and many balls rollably fitted into the ball rolling grooves of the guide rail and the ball rolling grooves of the slider main body, the improvement comprising an outer protector and an inner protector sandwiching the dust seal at front and rear sides of the dust seal, each of the outer and inner protectors having a substantially similar shape as the dust seal, with the dust seal sandwiched by the outer and inner protectors being attached to the slider main body.

It is preferable that the outer protector is attached to the slider main body through a spacer forming a minute gap between the outer protector and the front surface of the dust seal.

It is also preferable that the inner protector is closely in contact with the rear surface of the dust seal.

It is further preferable that the dust seal has lip portions slidably disposed in contact with groove surfaces of the ball rolling grooves of both sides of the guide rail and in contact with the groove surfaces of the retainer recess formed in the groove bottoms of the ball rolling grooves, and that each of the outer and inner protectors has a protruding shape smaller than the shape of the lip portion by the size of the clearance.

Owing to the provision of the protectors, the intrusion of foreign matters into the slider from the outside is prevented by the dust seal and by a cooperative action of the outer and inner protectors disposed in a sandwiching arrangement about the dust seal.

In particular, when a gap is formed between the outer protector and the front surface of the dust seal, the heat of weld sputters sticking to the outer protector is not conducted to the dust seal.

When the inner protector is made to closely contact the rear surface of the dust seal, the lip portions of the dust seal are backed up by the inner protector, and the taking of foreign matter into the slider is prevented.

Furthermore, when the dust seal has seal lips for wiping the groove surfaces of the ball rolling grooves of both sides of the guide rail and for wiping the groove surfaces of the retainer recess formed in the groove bottoms of the ball rolling grooves, and when each of the outer and inner protectors has a protruding shape smaller than the shape of the lip portion by the size of the clearance, it is possible to interrupt the intrusion of foreign matter deposited on the groove surfaces of the retainer recess.

BRIEF DESCRIPTION OF THE DRAWINGS

FIG. 9 is a perspective view of an example of a prior art linear guide apparatus.

DESCRIPTION OF THE PREFERRED EMBODIMENTS

Figure 1:
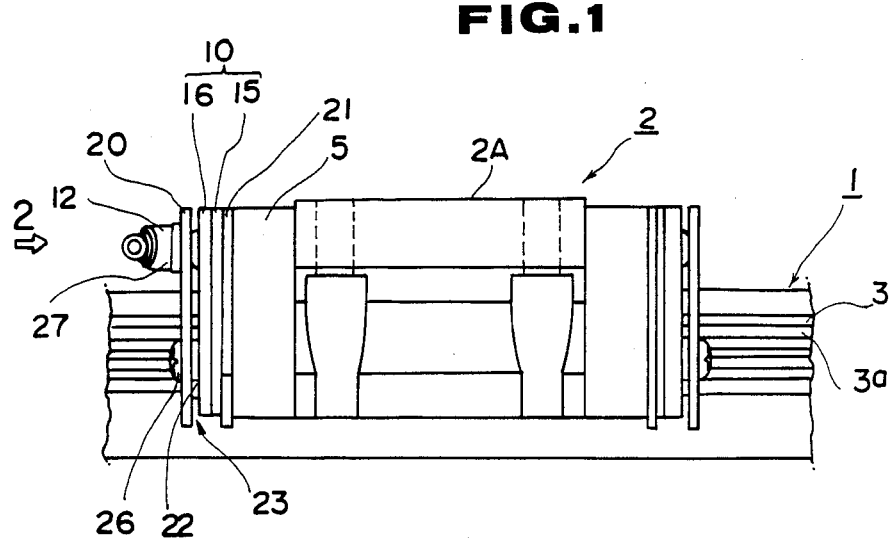
FIG. 1 is a side view illustrating an embodiment of the present invention.

FIGS. 1 to 6 show an embodiment of the present invention in which like parts to the prior art linear guide apparatus shown in FIG. 9 are designated by the like reference numerals.

Figure 7:
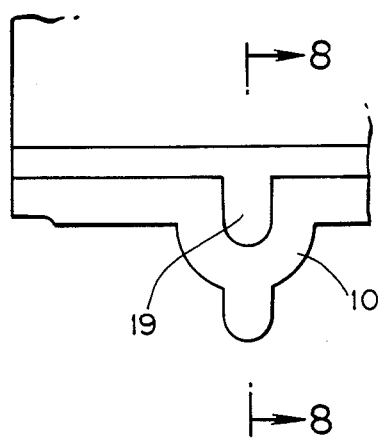
FIG. 7 is a plan view of a part of a seal member.
Figure 8:
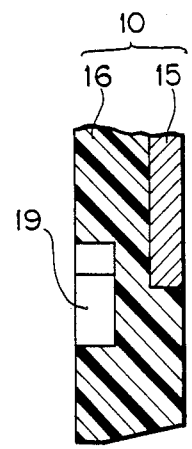
FIG. 8 is a cross sectional view generally taken along line 8—8 in FIG. 7.

FIGS. 7 and 8 show a second embodiment of a seal plate.

Figure 5:
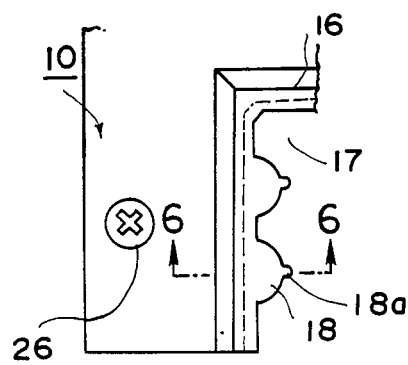
FIG. 5 is a partially enlarged view of a main part of the dust seal.

A dust seal 10 is constituted by a metallic plate 15 and a rubber member 16 vulcanized and bonded to a front surface of the metallic plate 15. The dust seal 10 is formed with an opening 17 at a lower center portion to allow a guide rail 1 to pass therethrough, and has generally an inverted U-shape. The rubber member 16 bonded to the metallic plate 15 has protrusions 18 along an inner edge of the opening 17, and each of the protrusions 18 has a semi-circular shape which corresponds to a boll rolling groove 3 of the guide rail 1. Furthermore, a small projection 18a is formed at a tip end of each protrusion 18 so that the small projection 18a corresponds to a wire-formed retainer recess 3a formed in a groove bottom of the ball rolling groove 3 (FIG. 5).

Figure 6:
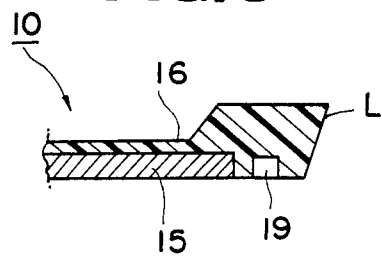
FIG. 6 is a cross sectional view generally taken along line 6—6 in FIG. 5.
Figure 6:
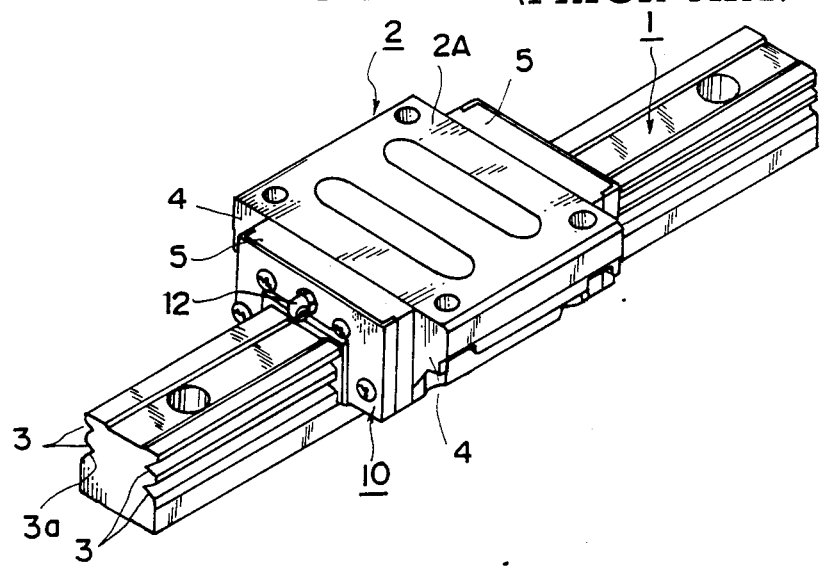

A lip portion L having an acute angle is formed as shown in FIG. 6 at an end edge of each of the protrusions 18 and the small projections 18a. The lip portion L is in contact with an appropriate interference with the groove surface of the ball rolling groove 3 of the retainer recess 3a, and wipes out foreign matter, such as dust, cuttings, weld sputters, etc., while sliding on these groove surfaces.

Figure 3:
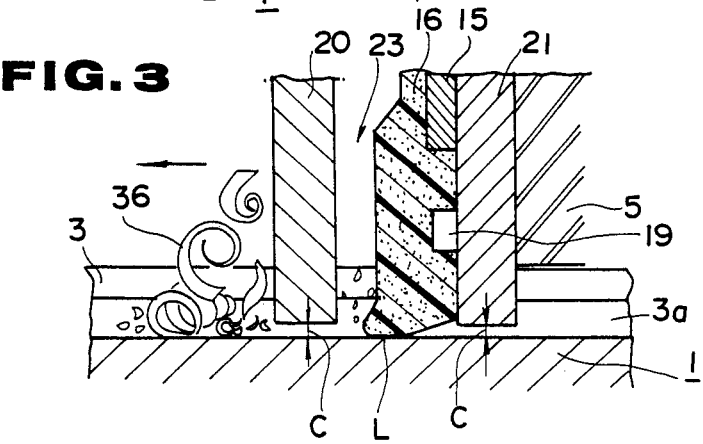
FIG. 3 is a cross sectional view generally taken along line 3—3 in FIG. 2.

As shown in FIGS. 3 and 6, a recess groove 19 is formed in the rear surface of a peripheral portion of the lip portion L of the rubber member 16 along the shape of the inner edge of the opining 17 so as to allow the lip portion L to be deformed elastically to a suitable extent to reduce a frictional force at the time of wiping.

The shape of the protrusion 18 is not necessarily limited to the illustrated semi-circular shape, and it is possible to employ, for example, a triangular shape to match the shape of the ball rolling groove 3 of the guide rail 1.

The dust seal 10 structured as described above is provided with an outer protector 20 made of a steel plate and an inner protector 21 made of a steel plate or a plastic plate respectively on the front and rear surfaces to sandwich the dust seal 10 therebetween. Each of the outer protector 20 and the inner protector 21 has a shape substantially similar to the shape of the dust seal 10.

A minute gap 23 is formed bewteen the outer protector 20 and the front surface of the dust seal 10 by collars 22 serving as spacers.

On the other hand, the inner protector 21 is attached to the rear surface of the dust seal 10 in close contact therewith.

Figure 2:
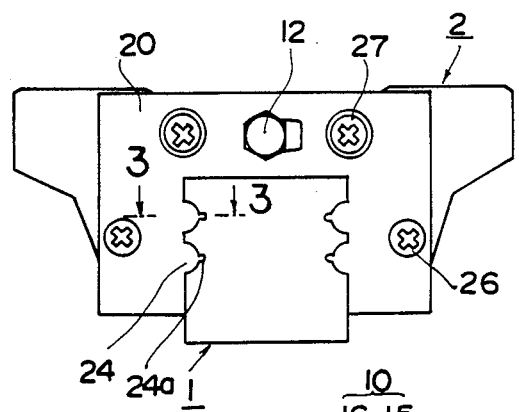
FIG. 2 is a front view viewed from the arrow 2 in FIG. 1.

The shape of the outer protector 20 and the inner protector 21 is made to be the same as the shape of the dust seal 10 (FIG. 2). Specifically, each of the outer and inner protectors 20 and 21, respectively, has an opening to allow the guide rail 1 to pass therethrough, and has generally an inverted U-shape. Semi-circular-shaped protrustions 24 and small projections 24a are formed at an inner edge of the opening of each of the outer and inner protectors 20 and 21, respectively, so that a minute clearance C is formed between the outer surface of the guide rail 1 and the tip ends of the protrusions 24 and the small projections 24a as shown in FIG. 2. These protrusions 24 and small projections 24a respectively correspond to the semi-circular protrusions 18 and small projections 18a of the dust seal 10.

Figure 4:
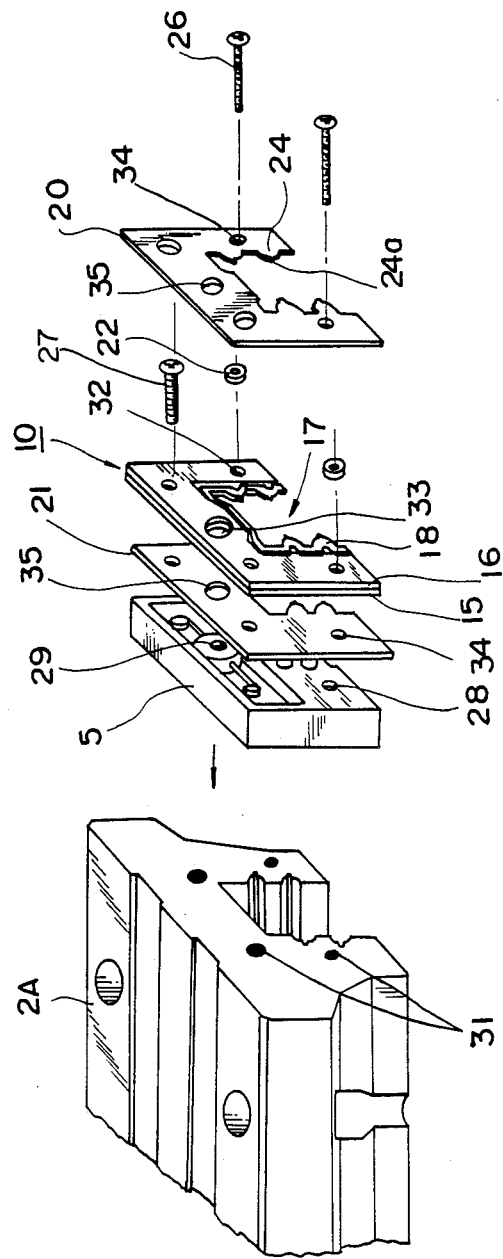
FIG. 4 is a perspective view showing the disassembled main parts of a dust seal of the present invention.

The outer protector 20, the dust seal 10 and the inner protector 21 are put on the front surface of the end cap 5, as shown in FIG. 4, and attached to the end surface of the slider main body 2A by fixing screws 26 and 27.

The end cap 5 has an inverted U-shaped shape similar to the dust seal 10, the outer protector 20 and the inner protector 21. A screw through hole 28 and a screw hole 29 for a grease fitting fixing screw are formed in the end surface of the end cap 5. Furthermore, screw holes 31 are formed in the end surface of the slider main body 2A. Correspondingly, a screw through hole 32 and a grease fitting through hole 33 are formed in the dust seal 10. A screw through hole 34 and a grease fitting through hole 35 are also formed in the outer protector 20 and the inner protector 21, respectively.

The screws 26 and 27 are inserted into the screw through holes 34 of the outer protector 20, then inserted through the spacers 22, further through the screw through holes 32 of the dust seal 10 and the screw through holes 34 of the inner protector 21, and further through the screw through holes 28 of the end cap 5, and screwed into the screw holes 31 of the slider main body 2A.

Lastly, a grease fitting 12 is inserted through the fixing holes 35 and 33 and screwed into the grease fitting screw hole 29 of the end cap 5.

Next, the operation or effect of the linear guide appearatus with the protector structured as described above will be described.

A large amount of foreign matter 36, such as cuttings, weld sputters, and the like, deposited on the outer surface and on the ball rolling grooves 3 of the guide rail 1 are removed first by the outer protector 20 as shown in FIG. 3.

In particular, since the gap 23 is formed between the outer protector 20 and the front surface of the dust seal 10, even when hot weld sputters among the foreign matter are deposited on the outer protector 20, the heat is seldom conducted to the dust seal 10. As a result, any burning of the dust seal 10 is prevented.

Fine foreign matter which have passed through the clearance C between theouter protector 20 and the guide rail 1 are removed by the lip portions L of the dust seal 10. In this case, since the inner protector 21 is closely in contact with the rear surface of the dust seal 10, the lip portions L of the dust seal 10 are backed up by the inner protector 21. Accordingly, it is possible to prevent the lip portions L from turning inwardly by being pushed by foreign matter and from allowing the foreign matter to pass inwardly therepast.

The lip portions L of the dust seal 10 not only slide on the outer surface and the groove surfaces of the ball rolling grooves 3 of both sides of the guide rail 1, but also on the groove surfaces of the retainer recess 3a formed in the bottom surfaces of the ball rolling grooves 3. Furthermore, each of the outer and inner protectors 20 and 21 has the protruding shape which is smaller than the lip portions L of the dust seal 10 by the size of the gap, and the inner protectors 21 back up the lip portions L. As a result, it is possible to also interrupt the intrusion of foreign matter which are adhered to the groove surfaces of the retainer recess 3a. The protection of those portions which have been easily damaged in the prior art can be achieved satisfactorily.

In this embodiment, since the front and rear sides of the dust seal 10 are protected by the outer protector 20 and the inner protector 21, it is possible to interrupt the intrusion of foreign matter from the outside completely independent of the mounting position or attitude of the linear guide apparatus, i.e., whether it is horizontal or vertical, and without being influenced by the size or amount of the foreign matter. In particular, damage of the dust seal 10 due to the heat of weld sputters can be prevented.

As described in the foregoing, an outer protector and an inner protector having a substantially similar shape to the shape of the dust seal are disposed at the front and rear sides of the dust seal. As a result, an advantage is provided in that comparatively large foreign matter is removed by the outer protector, and the intrusion of fine foreign matter are prevented by backing up the lip portions by the inner protector. Thus, the intrusion of foreign matter is interrupted even in an adverse environment and the heat deterioration of the dust seal is prevented. Moreover, the service life of the linear guide apparatus can be maintained, and the extension of the maintenance interval or a maintenance-free interval can be realized.

What is claimed is:

1. In a linear guide apparatus including:
   a guide rail extending axially and having ball rolling grooves respectively formed in outer side surfaces in an axial direction,
   a slider main body movably straddling said guide rail and having ball rolling grooves formed in inner surfaces of both side walls, the ball rolling grooves of said slider main body respectively corresponding to the ball rolling grooves of said guide rail, said slider main body further formed with ball return paths respectively penetrating both the side walls axially in parallel with the ball rolling grooves,
   end caps respectively joined to opposite ends of said slider main body, each of said end caps having a pair of ball return paths for communicating corresponding ones of the ball return paths and the ball rolling grooves with each other,
   dust seals respectively attached to axial end surfaces of said end caps, and
   a plurality of balls rollably fitted into the ball rolling grooves of said guide rail and the ball rolling grooves of said slider main body,
   the improvement comprising:
   an outer protector and an inner protector sandwiching each of said dust seals at front and rear sides of said dust seal, each of said outer and inner protector having a substantially similar shape to said dust seal, said dust seal sandwiched by the outer and inner protectors being attached to said slider main body, said outer protector being attached to said slider main body through a spacer forming a minute gap between said outer protector and the front surface of said dust seal.

2. In a linear guide apparatus including:
   a guide rail extending axially and having ball rolling grooves respectively formed in outer side surfaces in an axial direction,
   a slider main body movably straddling said guide rail and having ball rolling grooves formed in inner surfaces of both side walls, the ball rolling grooves of said slider main body respectively corresponding to the ball rolling grooves of said guide rail, said slider main body further formed with ball return paths respectively penetrating both the side walls axially in parallel with the ball rolling grooves,
   end caps respectively joined to opposite ends of said slider main body, each of said end caps having a pair of ball return paths for communicating corresponding ones of the ball return paths and the ball rolling grooves with each other,
   dust seals respectively attached to axial end surfaces of said end caps, and
   a plurality of balls rollably fitted into the ball rolling grooves of said guide rail and the ball rolling grooves of said slider main body,
   the improvement comprising:
   an outer protector and an inner protector sandwiching each of said dust seals at front and rear sides of said dust seal, each of said outer and inner protector having a substantially similar shape to said dust seal, said dust seal sandwiched by the outer and inner protectors being attached to said slider main body,
   said dust seal having lip portions respectively formed by protrusions having small projections further protruding from inner edges of the protrusions so that the protrusions are slidably in contact with the groove surfaces of the ball rolling grooves of both sides of said guide rail and the small projections are in contact with the groove surfaces of retainer recesses formed in the groove bottoms of the ball rolling grooves of said guide rail, and each of said outer protector and inner protector has protrusions and small projections which are similar in shape but are smaller than the protrusions and the small projection of the lip portion of said dust seal by the size of a clearance between a peripheral edge of the lip portion and an outer surface of said guide rail, and wherein said inner protector is disposed closely in contact with the rear surface of said dust seal with the small projections of said inner protector protruding into the retainer recesses so that the protrusions and the small projections of said dust seal are backed up and supported by said inner protector thereby to prevent the lip portions of said dust seal from turning backwardly by being pushed by foreign matter.

3. The linear guide apparatus according to claim 2 wherein the small projections of said outer protector protrude into the retainer recesses to thereby protect the small projections of said dust seal from being hit by foreign matter.

* * * * *